Aug. 11, 1970     L. C. CAREY ET AL     3,523,397

DISPLAY PACKAGE AND METHOD OF FORMING DISPLAY PACKAGES

Filed Sept. 19, 1967     7 Sheets-Sheet 1

INVENTORS
LARRY C. CAREY
IRA N. STONE
BY
Learman, Learman & McCulloch

ATTORNEYS

Aug. 11, 1970   L. C. CAREY ET AL   3,523,397
DISPLAY PACKAGE AND METHOD OF FORMING DISPLAY PACKAGES
Filed Sept. 19, 1967   7 Sheets-Sheet 2
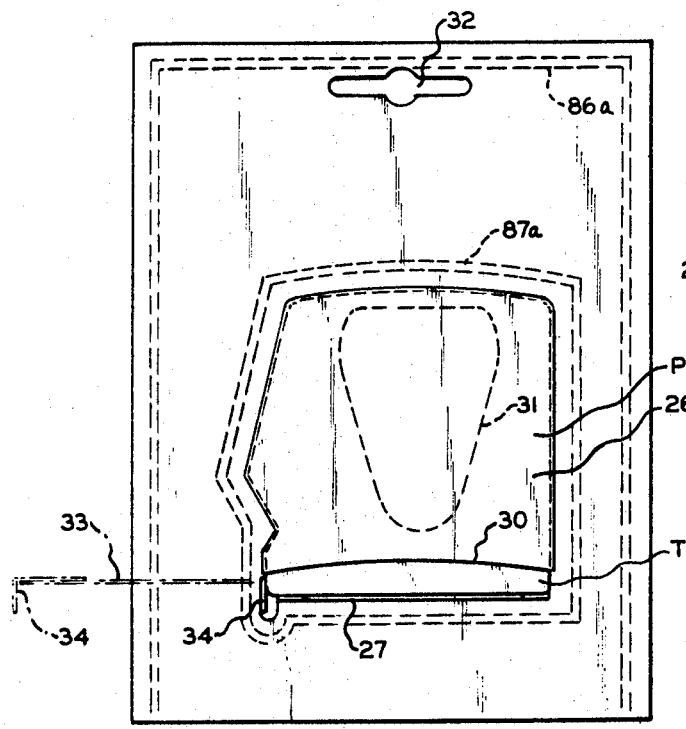
FIG. 3
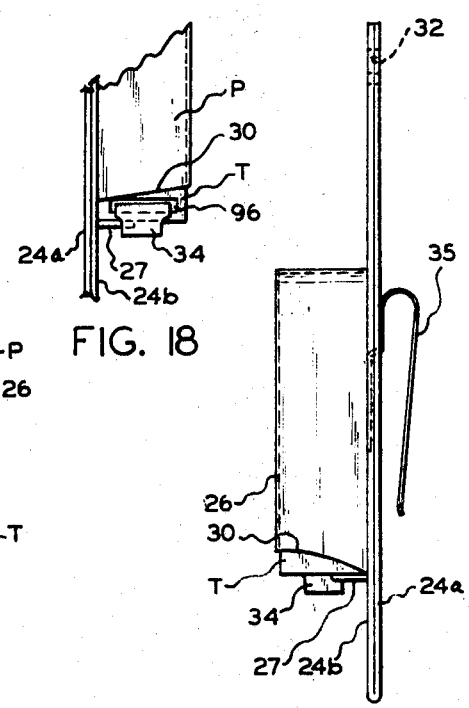
FIG. 18
FIG. 4
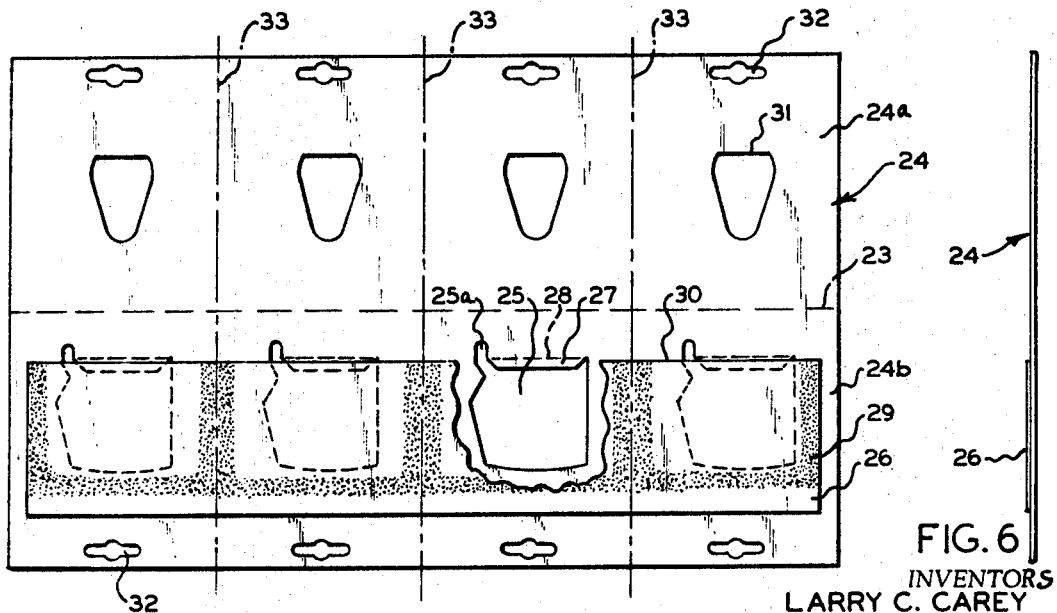
FIG. 5
FIG. 6
INVENTORS
LARRY C. CAREY
IRA N. STONE
BY
Learman, Learman & McCulloch
ATTORNEYS Aug. 11, 1970   L. C. CAREY ET AL   3,523,397
DISPLAY PACKAGE AND METHOD OF FORMING DISPLAY PACKAGES
Filed Sept. 19, 1967   7 Sheets-Sheet 5

INVENTORS
LARRY C. CAREY
IRA N. STONE
BY
Learman, Learman & McCulloch

ATTORNEYS

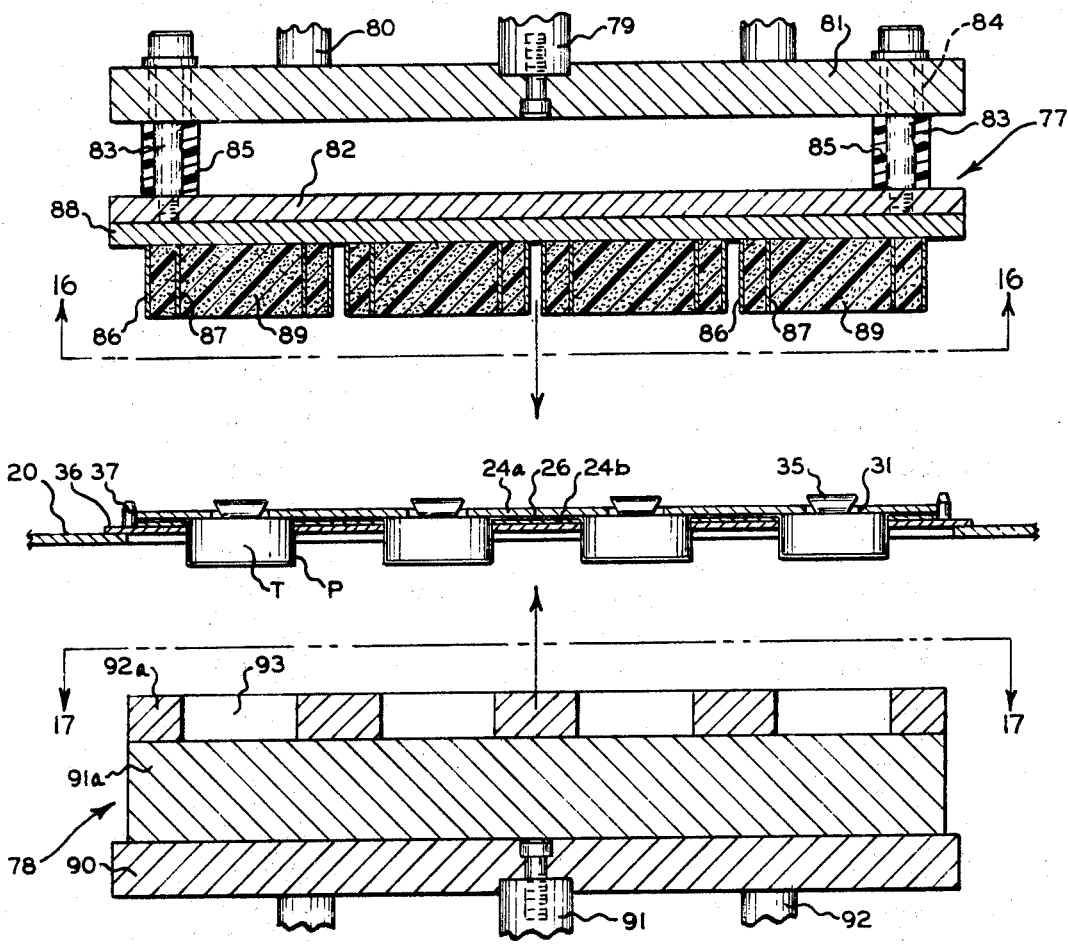
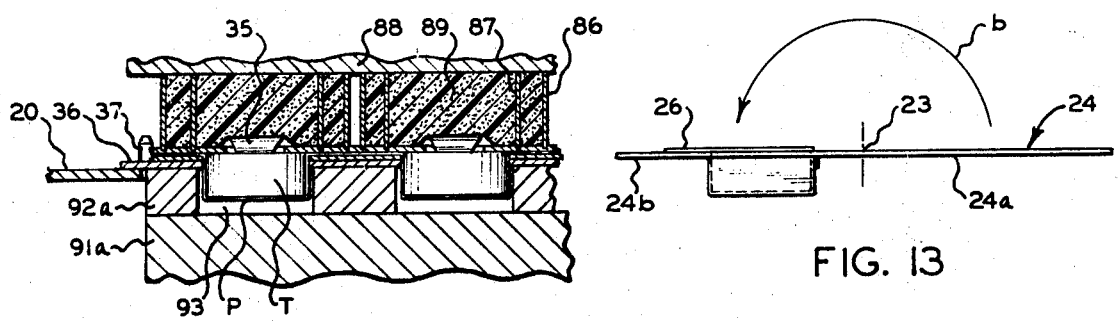
FIG. 14
FIG. 15
FIG. 13

United States Patent Office 3,523,397
Patented Aug. 11, 1970

3,523,397
DISPLAY PACKAGE AND METHOD OF
FORMING DISPLAY PACKAGES
Larry C. Carey, Raleigh, N.C., and Ira N. Stone, Highland Park, Ill., assignors, by direct and mesne assignments, to Stone Container Corporation, a corporation of Illinois, and Cooper Industries, Inc., Houston, Tex., a corporation of Ohio
Filed Sept. 19, 1967, Ser. No. 668,821
Int. Cl. B65b 43/10, 47/08
U.S. Cl. 53—30          8 Claims

ABSTRACT OF THE DISCLOSURE

A method of forming a display package having a supporting substratum and a plastic film sheath or pocket shrunk to snugly embrace an article such as a measuring tape, comprising the steps of: moving to deforming station a backer card having an opening substantially covered by a shrinkable, deformable plastic film strip which is secured at three sides to the card and has a fourth side with a remaining edge free of the card; heating and deforming the plastic film to form a three-sided pocket therein of approximately the shape of the article to be formed except at an open end bounded by the remaining edge; and shrinking the plastic film strip to cause the plastic pocket to closely conform to the size and shape of the article but leave the pocket open at the one end and expose a predetermined portion of the article.

This invention relates to film packaging and composite display packages of the type employing a paperboard substratum on which an article is supported and a synthetic thermoplastic film sheath, and more particularly relates to a package in which the film sheath snugly embraces and conforms to the shape of an article such as a measuring tape wherein it is necessary to have access to one end of the article for purposes such as the inspection of a withdrawable part.

BACKGROUND OF THE INVENTION

Methods for forming display packages wherein a plastic film strip is shrunk to perimetrally envelop and seal an article therein are disclosed in U.S. Pat. No. 3,195,284, wherein a plastic film material having a characteristic known as elastic memory is employed. In the method disclosed in the aforementioned patent, a plastic window of the general shape of the product and completely enveloping it is molded in a plastic film strip with differential pressure forming equipment initially, and then the plastic film strip is heat shrunk to form a film package for the article which snugly embraces its configurations and contours. Such film packages are not, we have discovered, well suited to displaying articles such as measuring tapes, and it is a prime object of the present invention to provide a method of forming a novel display package wherein the plastic film strip may be shrunk to conform to the shape and size of the article to be displayed while at the same time exposing an end of the article so that a withdrawable part, such as a tapeline, may be withdrawn by the customer and inspected without destroying the package or cutting a hole in it.

One of the prime objects of the present invention is to provide a method of forming a film package display unit for multiple articles which permits inspection of certain withdrawable portions of the article while at the same time snugly embracing the article and preventing it from being slipped from the display package by shoplifters and children.

Still another object of the invention is to provide a method of film packaging products of the character described wherein a lower supporting floor for supporting the exposed end of the article is automatically formed at the time the pocket is thermoformed in the plastic film strip.

Still a further object of the invention is to provide a reliable and efficient method of packaging articles of the character described which provides for the protrusion of a rear part, such as a hook.

Referring now more particularly to the accompanying drawings, FIG. 1 is a somewhat schematic side elevational view of a typical machine for performing the process, taken on the line 1—1 of FIG. 2;

FIG. 3 is a side elevational view of a display package formed according to the invention;

FIG. 4 is an edge elevational view thereof;

FIG. 5 is a reduced top plan view of one of the backer cards utilized to form a plurality of packages at the same time;

FIG. 6 is an edge elevational view thereof;

FIG. 13 is a reduced size, edge elevational view showing a backer card in which pockets have been formed and illustrating the manner in which the card is then folded over by the machine;

FIG. 14 is a sectional elevational view illustrating apparatus for heat fusing the folded over cardboard backer card around articles which have been placed into the pockets formed;

FIG. 15 is a similar sectional, fragmentary elevational view on an enlarged scale showing the sealing die in heat sealing position;

FIG. 18 is a fragmentary edge elevational view of a packaged measuring tape.

Figure 2:
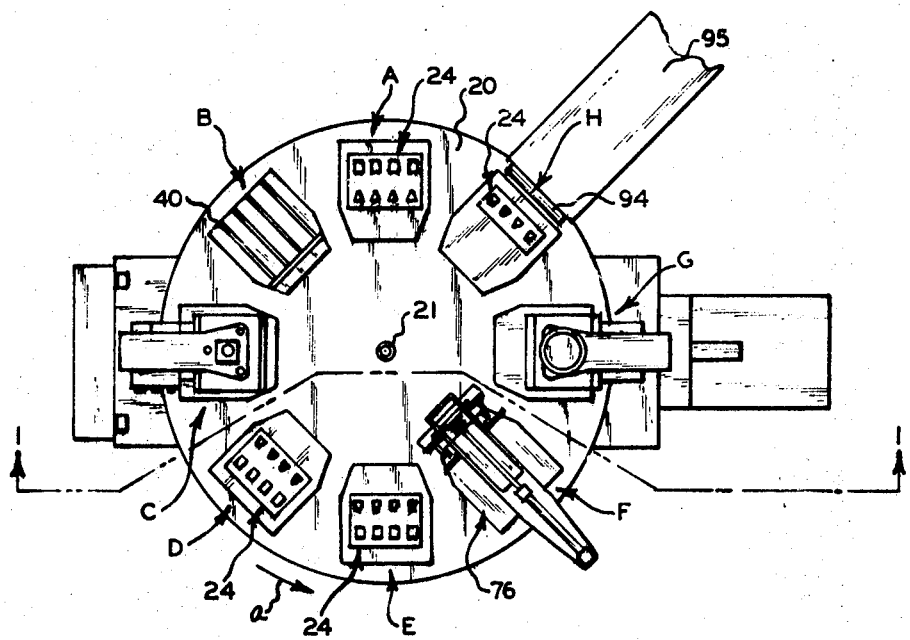
FIG. 2 is a somewhat schematic top plan view of the machine.
Figure 1:
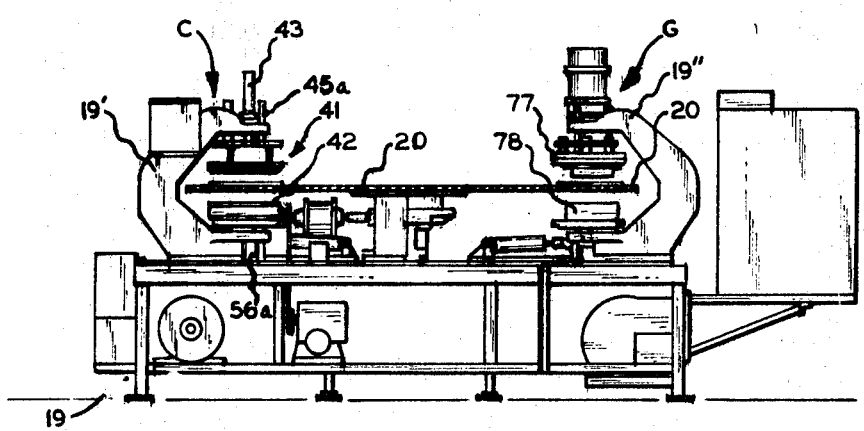

Referring now more particularly to the accompanying drawings wherein a preferred embodiment of the invention only is illustrated, and in the first instance to FIGS. 1 and 2 thereof, the apparatus used includes a multiple station rotary turntable generally designated 20 mounted for rotation in the direction a (FIG. 2) about a central shaft 21 which is journaled on a frame 19. As in the aforementioned patent, the table 20 is rotated intermittently by an electric motor through suitable geneva mechanism or the like and moves somewhat rigid backer or substratum cards generally designated 24 from a loading station A to a succession of stations counterclockwisely, each card 24 stopping at each station successively for a period of dwell in the usual manner to permit the required operations to take place. In FIG. 2 the station B is a heating station; the station C is a thermoforming station; stations D and E are product loading stations; station F is a card folding station; station G is a sealing station; and station H is an unloading station.

The particular apparatus illustrated is capable of forming four packages simultaneously and FIG. 5 illustrates a backer card which is employed. However, it should be clear that fewer or more display packages could be formed simultaneously by simply adapting the apparatus which will be described. The broken line 23 in FIG. 5 indicates a fold crease placed in the normally paperboard backer sheet or card 24 which will permit it to be readily folded over in the direction of the arrow b as illustrated in FIG. 13, and the numeral 24a has been used to designate the half which will be foded over upon the half 24b during the processing operation.

It will be seen that each of the portions 24b is provided with a series of four through openings 25 in the approximate shape of a measuring tape, which is the article to be packaged in the particular method illustrated, and that a thin plastic film strip 26 in the neighborhood of 3 to 5 mils in thickness is secured to the portion 24b on the inner face thereof, as shown in FIG. 13. As in the patent mentioned, the plastic sheet material may be polyvinyl chloride or any other plastic sheet material which can be heat formed, will hold a semi-rigid pocket shape immediately after formation, and then has an elastic memory which provides it with the capability of shrinking, when reheated, to reduce the pocket to a smaller shape which snugly embraces the article. As indicated particularly in FIG. 5, each opening 25 includes a leg portion 25a and each card portion 24b includes a tab 27 adjacent each opening 25 which extends inwardly into the opening 25 normally required for the article from a fold crease or perforation 28. The strip 26 is adhesively bonded to the card portion 24b in the manner indicated by the shaded areas 29 in FIG. 5 on three sides of the opening 25 by a suitable thermoset adhesive but is left free of the card 24 along its fourth edge or side 30, and it will be noted that in FIG. 5 this edge or side 30 extends sufficiently to overlie the tab portion 27.

In the portion 24a of each backer card 24, openings 31 are provided which, as will later appear, permit the passage of clips affixed to the rear face of the measuring tape casing, and openings 32 provided along each edge 24a and 24b of the card will, when the packages are formed, provide optional openings permitting the individual package formed to be hung on a wall hook or the like for display purposes. The chain lines 33 indicate where the four individual packages formed may be severed to form the individual packages illustrated in FIGS. 3 and 4.

In FIGS. 3 and 4 a measuring tape generally indicated by the letter T is shown snugly enclosed by the film package P and it will be observed that the lower end of tape T projects downwardly beyond the package P so that the tapeline 33 (see the chain lines in FIG. 3), which has the usual tape hook 34 on its outer end, may be withdrawn from the tape casing in the manner indicated, and inspected. It will be observed that the tab 27 has been folded outwardly in the completed package and aids the package P in supporting the article. A belt clip 35 which attaches to the rear of the tape casing T extends out the opening 31, as illustrated in FIG. 4.

Figure 7:
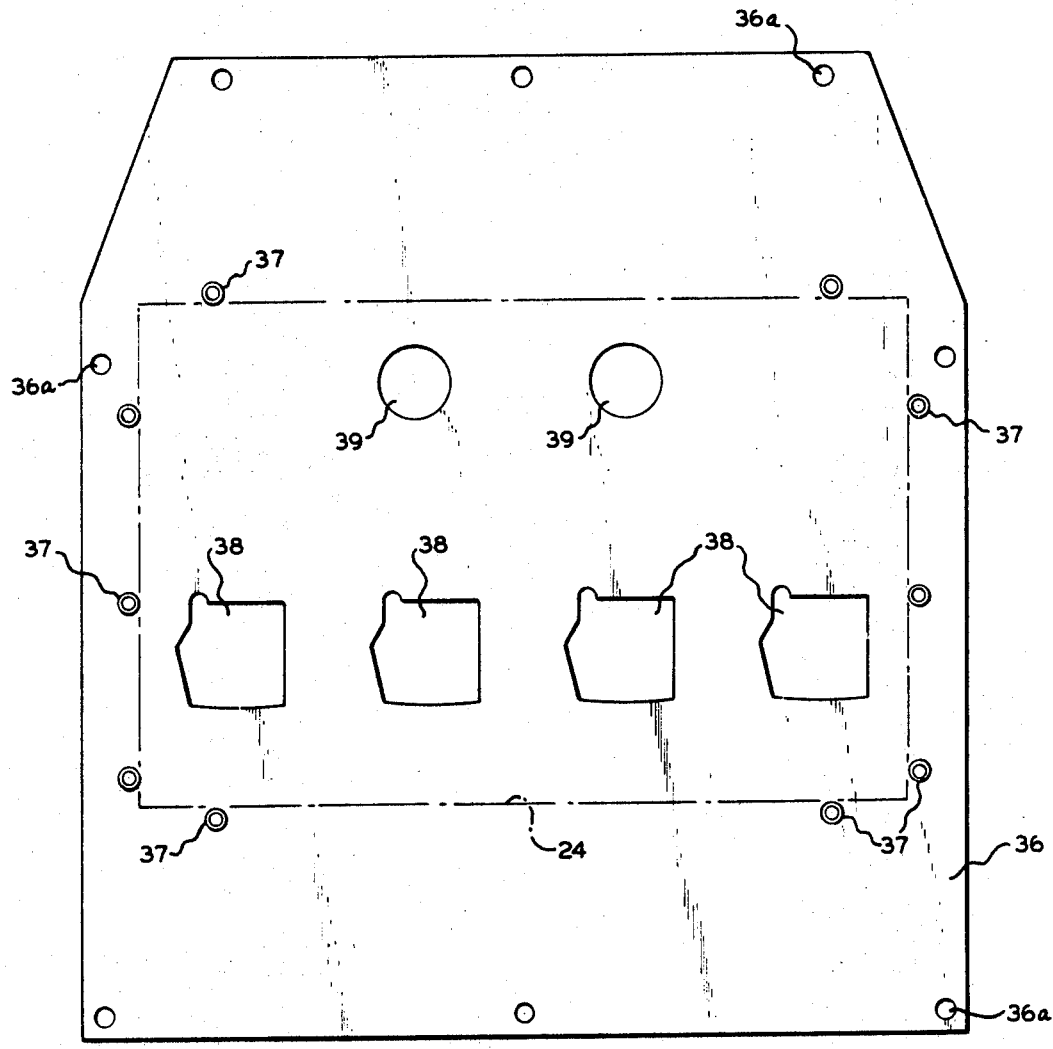
FIG. 7 is a top plan view of a carrier plate used in the machine to move the backer card from station to station, the diagrammatic lines outlining a backer card mounted in position thereon.
Figure 8:
FIG. 8 is an edge elevational view of the carrier plate only.

As FIGS. 7 and 8 illustrate, a carrier plate 36 is provided and has locating pins 37 for precisely locating the backer card 24 thereon in the manner indicated by the chain lines. Tape measure shaped openings 38 are provided in the plate 36, as are card fold access openings 39, and openings 36a along the edges permit the mounting of the plate 36 to the turntable surface 20. During the pause of a mounting plate 36 at station A, feeding mechanism (not shown) places a backer card 24 thereon in the manner indicated in FIG. 7 and the next index of turntable 20 brings the backer card to the heating chamber at station B, where an underlying electric resistance heater 40 may be employed to heat the film 26. The adhesive used at areas 29 is a thermosetting adhesive which is unaffected even though heated to some degree during this operation.

From the heating station B, where the plastic sheet is heated in a chamber maintained at a temperature of approximately 745° F., each blank or card 22 is then moved to the forming station C. At the forming station C an upper die member generally designated 41 and a lower die or mold member generally designated 42 are provided, as illustrated particularly in FIGS. 9 and 10, and the turntable 20 is rotated to a position to dispose between them the plate 36, as indicated particularly in these figures. A double-acting, fluid pressure operated cylinder such as shown at 43 may have its piston rod 44 connected to the upper plate 45 of the die assembly 41 which has upwardly extending guide posts 45a which are slideably received by by subframe portion 19'. The plate 45 carries a lower plate 46 on guide rods 47 which extend freely through guide openings 48 provided in plate 45 so that plates 45 and 46 are capable of relative movement but are normally maintained in the position shown in FIG. 9 by the return springs 49.

Mounted beneath the plate 46, as with bolts 50, is an angle-shaped dependent frame 52 which secures a thin elastic rubber diaphragm 53 as shown. The diaphragm 53, which is highly elastic in nature, extends downwardly beyond the dependent portion 52a of frame 52 which mounts a perimetral sealing ring 54. Openings 55 are provided in the plate 46 to open the area behind diaphragm 53 to atmosphere but it should also be clear that compressed air-supplying hoses may be coupled to these openings 55 for delivering air under a predetermined pressure to the diaphragm 53 for a purpose which will presently become apparent.

Figure 9:
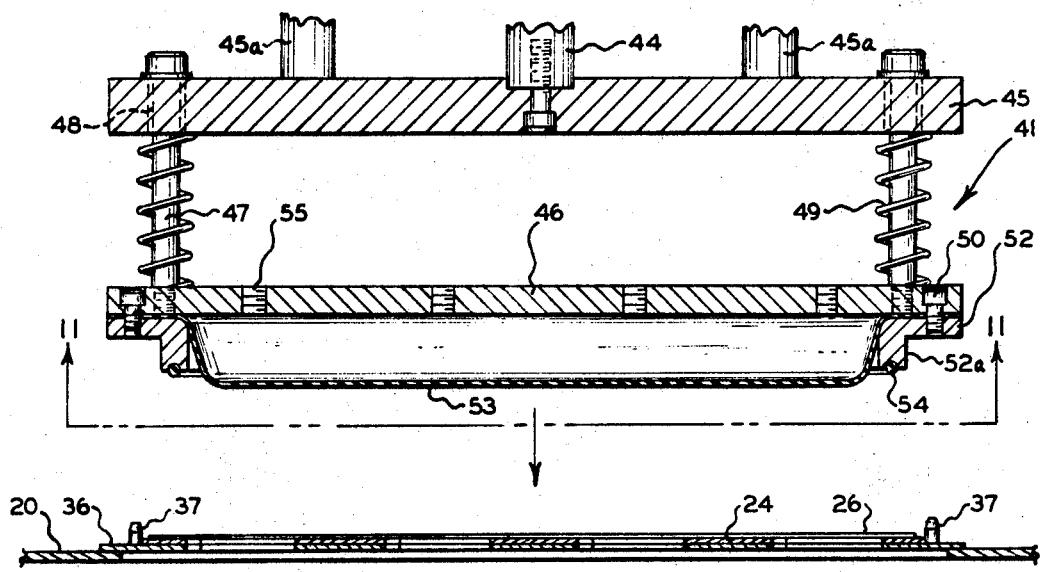
FIG. 9 is an enlarged, sectional, elevational view illustrating the manner in which the article receiving pocket is initially thermoformed in the plastic sheet, with the upper and lower mold apparatus being illustrated in initial retracted position.
Figure 9:
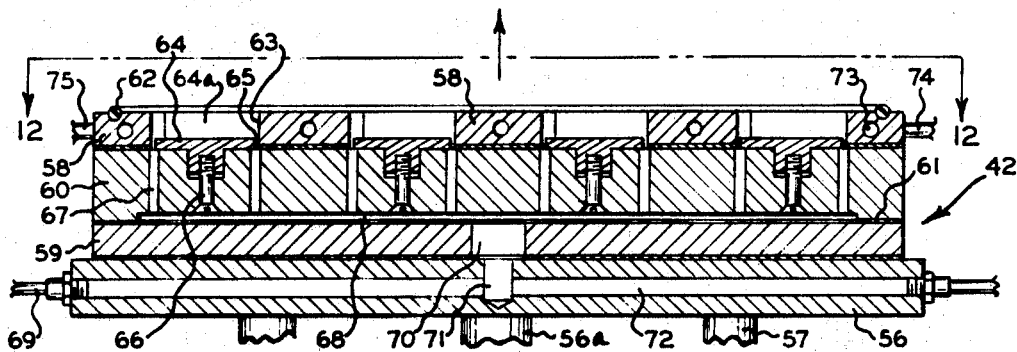
Figure 12:
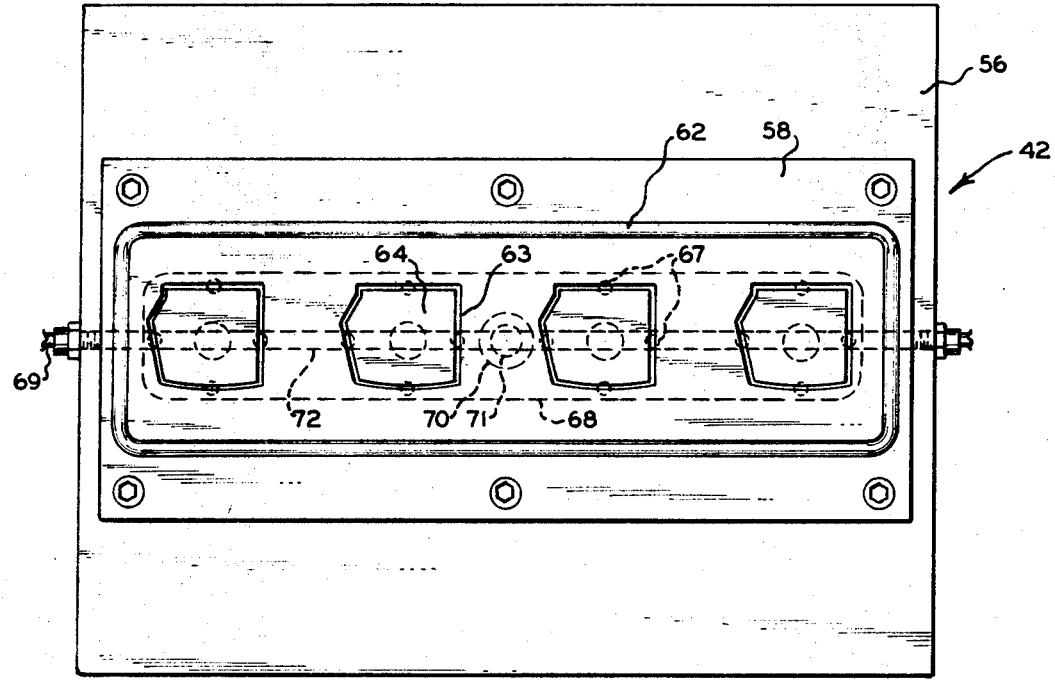
FIG. 12 is a top plan view of the female mold employed.

As FIGS. 9 and 12 indicate, the lower die assembly 42 includes a base plate 56 supported for back-and-forth movement on the ram or piston 56a of a second double-acting, fluid pressure operated cylinder 56b, the plate 56 having guide rods 57 slideably received by the frame F' to guide its back-and-forth movement. A mold comprising upper and lower plates 58 and 59 and a middle plate 60 is adhesively secured to the plate 56 as at 61, the plates 58–60 also being sealed by a gasket 61. As FIG. 12 illustrates, a perimetral sealing ring 62 is mounted by the plate 58 surounding a row of tape measure-shaped openings 63 which are cut therein. Tape measure-shaped bottom plates 64 which are of a size to leave a perimetral opening 65 between the edges of each plate 64 and the perimetral opening 65 between the edges of each plate 64 and the adjacent marginal walls of the openings 63 are secured to plate 60 as with screws 66. Thus, openings 67 drilled in the plate 60 and connecting with a manifold passage 68 may be provided to communicate the female cavities provided by the marginal walls of openings 63 and the bottom plate 64 with a vacuum source 69 through an opening 70 in plate 59 and openings 71 and 72 in plate 56.

Figure 10:
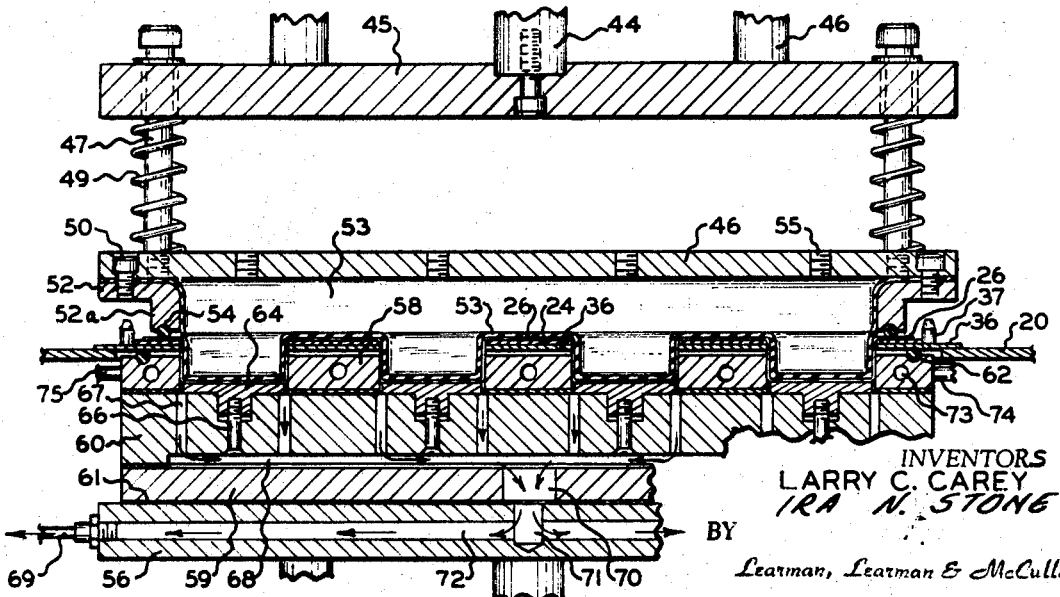
FIG. 10 is a similar view with the apparatus being shown in a closed position in which the pockets have been formed in the plastic strip.
Figure 11:
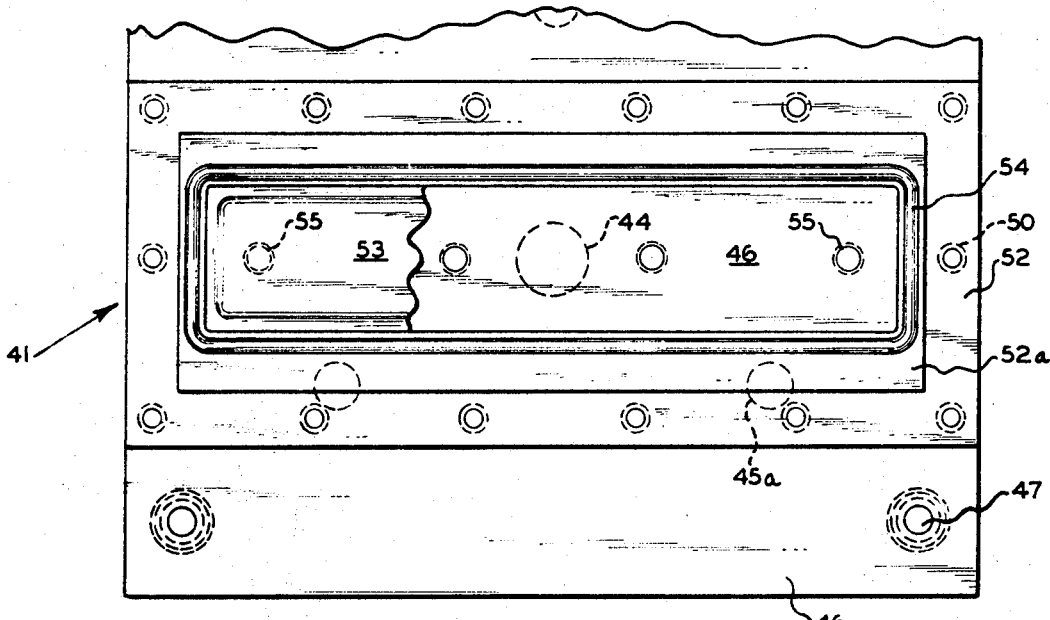
FIG. 11 is an inverse plan view of the male die employed.

In operation the female die assembly 42 is moved upwardly to the indexing table 22 in the manner indicated in FIG. 10 first of all, and then the upper die assembly 41 or any other suitable upper die assembly is moved downwardly to the mounting plate 36, the suction forces exerted deforming the diaphragm 53 to force the plastic sheet 26 to conform to the shape of the die cavities 64a. A liquid coolant is circulated through coolant passages 73 surrounding each cavity 63 which have connecting inlet and outlet tubes 74 and 75 leading respectively to a source and a drain. Tap water may be used as the coolant, which chills the mold and immediately sets the pockets P formed in a condition of semirigidity. When the upper and lower mold assemblies 41 and 42 are then removed vertically, the cardboard carrier 22 can be moved to stations D and E where operators place tape measures in the pockets P formed. From station E each carrier plate 36 moves to a station F where the portion 24a is folded over, as shown in FIG. 13, upon the portion 24b of the card 24 and then moves to station G where, as in the patent mentioned, the cardboard is sealed around the openings 38. The foldover mechanism shown at 76 in FIG. 2 is of the same character mentioned in the patent identified and will not be described in detail.

The high frequency sealing mechanism shown at station G is also of the character described in the aforementioned patent and includes an upper die assembly generally identified at 77 and a lower die assembly generally indicated by the numeral 78. As in the case of the die mechanism at station C, the carrier plate 36 with the cardboard backer folded over is supplied by the turntable 20 to a position between the upper and lower die assemblies 77 and 78, which are mounted to move toward and away from it. The upper die assembly 77 is connected with the piston rod 79 of a double-acting, fluid pressure actuated cylinder and has guide rods 80 which are slideably received in the frame 19″ in a manner to linearly guide the up-and-down movement of the assembly 77. An upper plate 81 mounts the guide rods 80 and a lower insulating plate 82 is supported by the plate 81 on nylon bolts 83 which pass freely through openings 84 in the plate 81 and thereby provide for relative movement of the plates 81 and 82, there being load bearing insulating sleeves 85 for maintaining the plates 81 and 82 in the position shown in FIG. 14.

Figure 16:
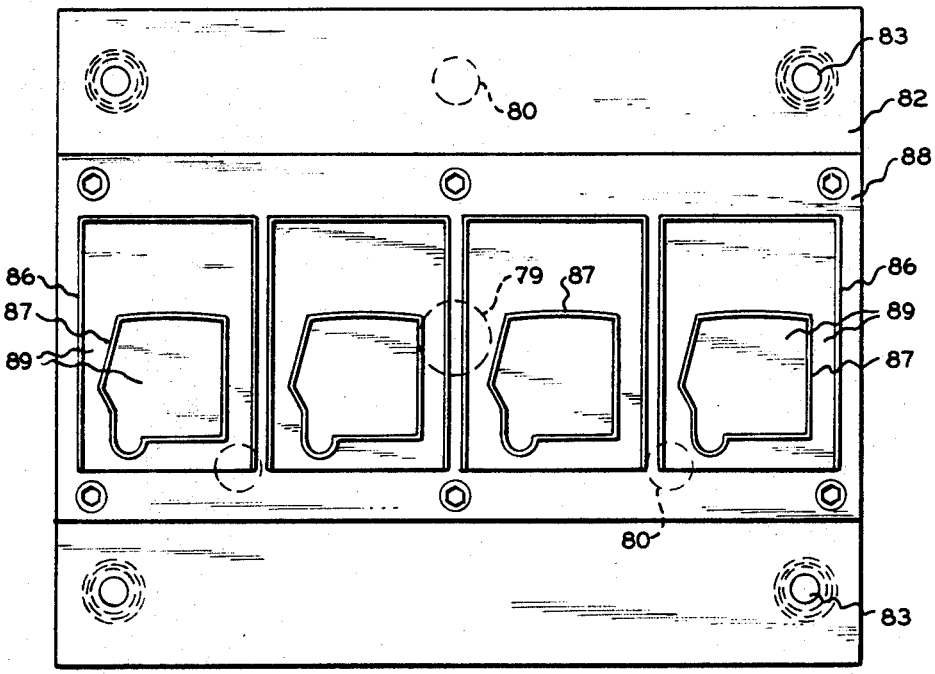
FIG. 16 is an inverse plan view taken on the line 16—16 of FIG. 14.
Figure 17:
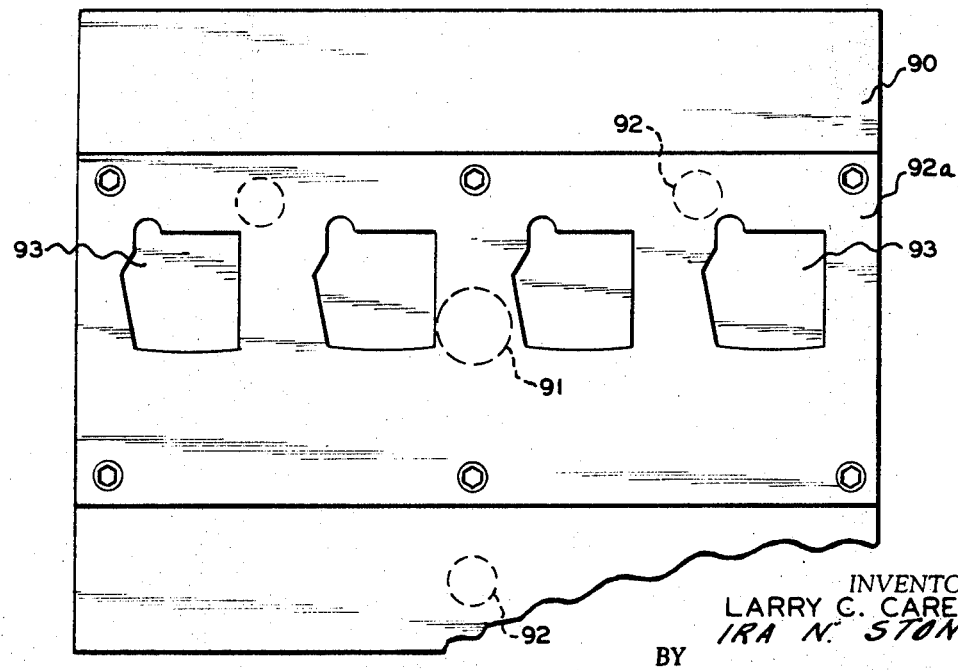
FIG. 17 is a top plan view taken on the line 17—17 of FIG. 14.

A series of four die frame sets, each comprising an outer frame 86 and an inner frame 87 in the shape of a tape measure T (see FIG. 16), are mounted on conductive plate 88, and a resilient, elastic foam material 89 which serves as a nonconductive stripping medium is adhesively bonded to the plate 88 as shown. As in the patent mentioned, a high frequency current is supplied to the plate 88 which is capable of virtually instantaneously heating an adhesive coating applied to the inner surfaces of both card sections 24a and 24b to a state of fusibility and it is in this manner that the inner engaging surfaces of the folded over card portions 24a and 24b are sealed together along sealing lines 86a and 87a (see FIG. 3).

The lower mold assembly 78 includes a base plate 90 mounted on the piston rod 91 of a double-acting, fluid pressure operated cylinder and has depending guide rods 92 which are slideably received by the frame portion 19″ to guide linear movement of the mold assembly 78. mounted on the base plate 90 are a middle plate 91a and an upper plate 92a having openings 93 of a size to receive the pockets P which have been formed in the film strip 26.

When the sealing has been accomplished at station G, and upon withdrawal of the upper and lower mold or die assemblies 77 and 78, the carrier plate 36 is indexed to station H, where it is removed from the turntable 20 by suitable lift mechanism (not shown) and passes on a conveyor belt 94 through a heating tunnel 95 to slicing mechanism which cuts the packages formed into individual packages along the lines 33 of FIG. 5. The heating tunnel 95, which is maintained at a temperature in the neighborhood of 230° F., heats the plastic film strip 26 and the pockets P formed therein and causes them to shrink to snugly embrace the tape measures T.

As FIG. 18 indicates, the edge 30 of the pocket P formed must in each instance clear the tape withdrawal opening 96 to permit the free withdrawal and retraction of the tapeline 33. At the forming station C, where the pockets P are formed in the film strip 26, the pockets P are formed to the shape of the cavities 63 by the flexible elastic diaphragm 53, which is drawn by suction forces into the shape shown in FIG. 10. The pockets P are approximately 1/32 of an inch larger along the three closed sides of each pocket P and 1/32 of an inch greater in depth than the tape measure T which is placed into them at one of the stations D and E with its bottom adjacent the open end of the pocket P. In tunnel 95 shrinkage of the pocket occurs so that the tape measure T is snugly gripped along its three sides and across its exposed front face by the plastic film 26 to form a taut "stretch" package. The position of edge 30 is determined in advance in relation to the depth of the cavities 63, as determined by the position of the plate 64, and with attention to the degree of shrinkage possible so that, in a completed package, edge 30 is stretched tautly across the exposed front face of the tape measure T and clears the tapeline withdrawal opening 96 at the one side. The edge 30 must not extend beyond a point where, after formation of the package, it blocks the withdrawal of the tapeline 33, and the position of the edge 30 shown in FIG. 5 in which it extends substantially to the fold line 28 is aproximately the proper location for the free edge 30 of the strip 26. The floor portion 27 which in the completed package supports the tape measure T from the bottom is folded outwardly at the time the pockets P are formed by the diaphragm 53.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

We claim:

1. A method of packaging articles such that one end of the article remains exposed, in plastic pockets shrunk to the shape of the article and protruding from a more rigid backer card comprising the steps of: moving a backer card having an opening of greater size than the article substantially covered by a shrinkable, deformable, thermoplastic film strip portion with three sides surrounding two sides and one end of the opening anchored to the card around the opening and its remaining edge free of the card and positioned in a predetermined location relative to the remaining edge of the opening, to a deforming station; thermoforming a protruding pocket in said film strip portion in the general shape of the article, with an open end bounded by said remaining edge of the film strip portion and with the marginal edge of the open end withdrawn from said remaining edge of the opening a predetermined amount as a result of the formation of the pocket, and disposing an article in said pocket with the end to be exposed at said open end; and shrinking the film strip portion so that the pocket is caused to snugly conform to the shape of the article except for the exposed end thereof.

2. The method defined in claim 1 wherein said film strip portion is heated prior to deforming it.

3. The method defined in claim 1 wherein said shrinking of the film strip portion is effected by heating it.

4. The method defined in claim 1 wherein said remaining free edge of the film strip portion initially extends substantially to the said remaining edge of the opening.

5. The method defined in claim 1 wherein a support floor for the lower end of the article is formed in the card automatically during the thermoforming of said pocket.

6. A method of packaging tape measures having a lower tapeline dispensing opening in one side wall thereof such that the lower end thereof remains exposed, in plastic pockets shrunk to closely conform to the shape of the tape measure and protruding from a more rigid backer card comprising the steps of: moving a backer card, with an opening therein in the general shape of the tape measure substantially covered by a film strip portion of shrinkable, thermoplastic synthetic plastic with three sides surrounding the two sides and one end of the opening bonded to the card around the opening and the remaining edge of the plastic being free of the card and positioned in a predetermined location relative to the remaining edge of the opening, to a deforming station; heat stretching the area of plastic bounded by the said bonded sides and end to form a three-sided protruding pocket in said plastic strip portion with an open end bounded by said remaining edge of the plastic and disposing a tape measure in said pocket with the lower end exposed at said open end of the pocket to a predetermined extent; and shrinking the plastic strip portion so that the pocket is caused to snugly conform to the shape of the article and the said remaining free edge of the plastic is disposed above said tapeline opening.

7. The method defined in claim 6 in which said pocket is formed by moving a male die into a female die cavity and said male die bends a portion of said card at said remaining edge of the opening outwardly to form a support floor portion for the lower end of the tape measure during its travel into said cavity.

8. The method defined in claim 6 wherein one portion of said card is folded over said pocket and sealed to another portion of said card prior to shrinking the plastic strip portion.

References Cited

UNITED STATES PATENTS

| | | | |
|---|---|---|---|
| 3,139,182 | 6/1964 | Edell. | |
| 3,248,842 | 5/1966 | Peppler | 53—30 |
| 3,286,835 | 11/1966 | Crane | 53—30 X |

THERON E. CONDON, Primary Examiner

E. F. DESMOND, Assistant Examiner

U.S. Cl. X.R.

53—184